(12) United States Patent
Schueler et al.

(10) Patent No.: US 9,985,517 B2
(45) Date of Patent: May 29, 2018

(54) VOLTAGE SURGE PROTECTION FOR ACTIVE RECTIFIERS IN THE EVENT OF LOAD SHEDDING

(71) Applicant: SEG AUTOMOTIVE GERMANY GMBH, Stuttgart (DE)

(72) Inventors: Harald Schueler, Backnang (DE); Siegbert Sautter, Stuttgart (DE); Christopher Otte, Reutlingen (DE); Paul Mehringer, Stuttgart (DE); Jie Ge, Stuttgart-Hausen (DE); Wolfgang Feiler, Reutlingen (DE); Matthias Schmidt, Stuttgart (DE)

(73) Assignee: SEG Automotive Germany GMBH, Stuttgart (DE)

( * ) Notice: Subject to any disclaimer, the term of this patent is extended or adjusted under 35 U.S.C. 154(b) by 218 days.

(21) Appl. No.: 14/915,075

(22) PCT Filed: Jul. 28, 2014

(86) PCT No.: PCT/EP2014/066134
§ 371 (c)(1),
(2) Date: Feb. 26, 2016

(87) PCT Pub. No.: WO2015/028222
PCT Pub. Date: Mar. 5, 2015

(65) Prior Publication Data
US 2016/0211740 A1    Jul. 21, 2016

(30) Foreign Application Priority Data

Aug. 27, 2013 (DE) .......................... 10 2013 217 023
Sep. 6, 2013  (DE) .......................... 10 2013 217 896

(51) Int. Cl.
*H02M 1/32*    (2007.01)
*H02M 1/084*   (2006.01)
(Continued)

(52) U.S. Cl.
CPC ............... *H02M 1/32* (2013.01); *B60R 16/03* (2013.01); *H02M 1/084* (2013.01); *H02M 7/219* (2013.01);
(Continued)

(58) Field of Classification Search
CPC ....................................................... H02M 1/32
(Continued)

(56) References Cited

U.S. PATENT DOCUMENTS

| 2008/0013348 A1* | 1/2008 | Wiseman | ................ H02M 1/32 |
| | | | 363/54 |
| 2013/0094258 A1* | 4/2013 | Royak | ..................... H02M 1/32 |
| | | | 363/89 |

FOREIGN PATENT DOCUMENTS

CN    102165680 A    8/2011
DE    19835316 A1    2/2000
(Continued)

*Primary Examiner* — Joseph Chang
(74) *Attorney, Agent, or Firm* — Norton Rose Fulbright US LLP; Gerard Messina

(57) ABSTRACT

A rectifier module for an active bridge rectifier having two switching elements, connected in series between two end terminals, and between which a center tap is formed, and a control circuit including a monitoring unit, a synchronization unit, and a control unit, the monitoring unit detecting a measuring voltage and outputting a request signal when the measuring voltage exceeds an upper threshold value. The synchronization unit outputs a synchronization signal to a synchronization terminal as long as the monitoring unit outputs the request signal, and otherwise to monitor the synchronization terminal for a synchronization signal. The control unit switches one of the two switching elements into a conductive state at least in sections during an activation period of time, when the monitoring unit outputs the request signal and/or when the synchronization signal is detected and is optionally recognized as valid by the monitoring. Also (Continued)

described is an active bridge rectifier including corresponding rectifier modules, a generator array including such a bridge rectifier, a corresponding motor vehicle electrical system, an operating method, and an arrangement for the method.

18 Claims, 7 Drawing Sheets

(51) Int. Cl.
*H02M 7/217* (2006.01)
*H02M 7/219* (2006.01)
*H02P 9/00* (2006.01)
*H02P 25/22* (2006.01)
*H02P 29/024* (2016.01)
*B60R 16/03* (2006.01)
*H02P 9/14* (2006.01)

(52) U.S. Cl.
CPC .......... *H02M 7/2173* (2013.01); *H02P 9/006* (2013.01); *H02P 9/14* (2013.01); *H02P 25/22* (2013.01); *H02P 29/0241* (2016.02); *H02M 2001/327* (2013.01)

(58) Field of Classification Search
USPC ....................................................... 301/10.1
See application file for complete search history.

(56) References Cited

FOREIGN PATENT DOCUMENTS

| DE | 10 2009 046 955 | | 5/2011 |
|----|-----------------|----|--------|
| DE | 102012216008 | A1 | 3/2014 |
| EP | 0 777 309 | | 6/1997 |
| EP | 0777308 | A1 | 6/1997 |
| JP | 2012034459 | A | 2/2012 |
| WO | 2010082317 | A1 | 7/2010 |
| WO | 2012118701 | A2 | 9/2012 |

* cited by examiner

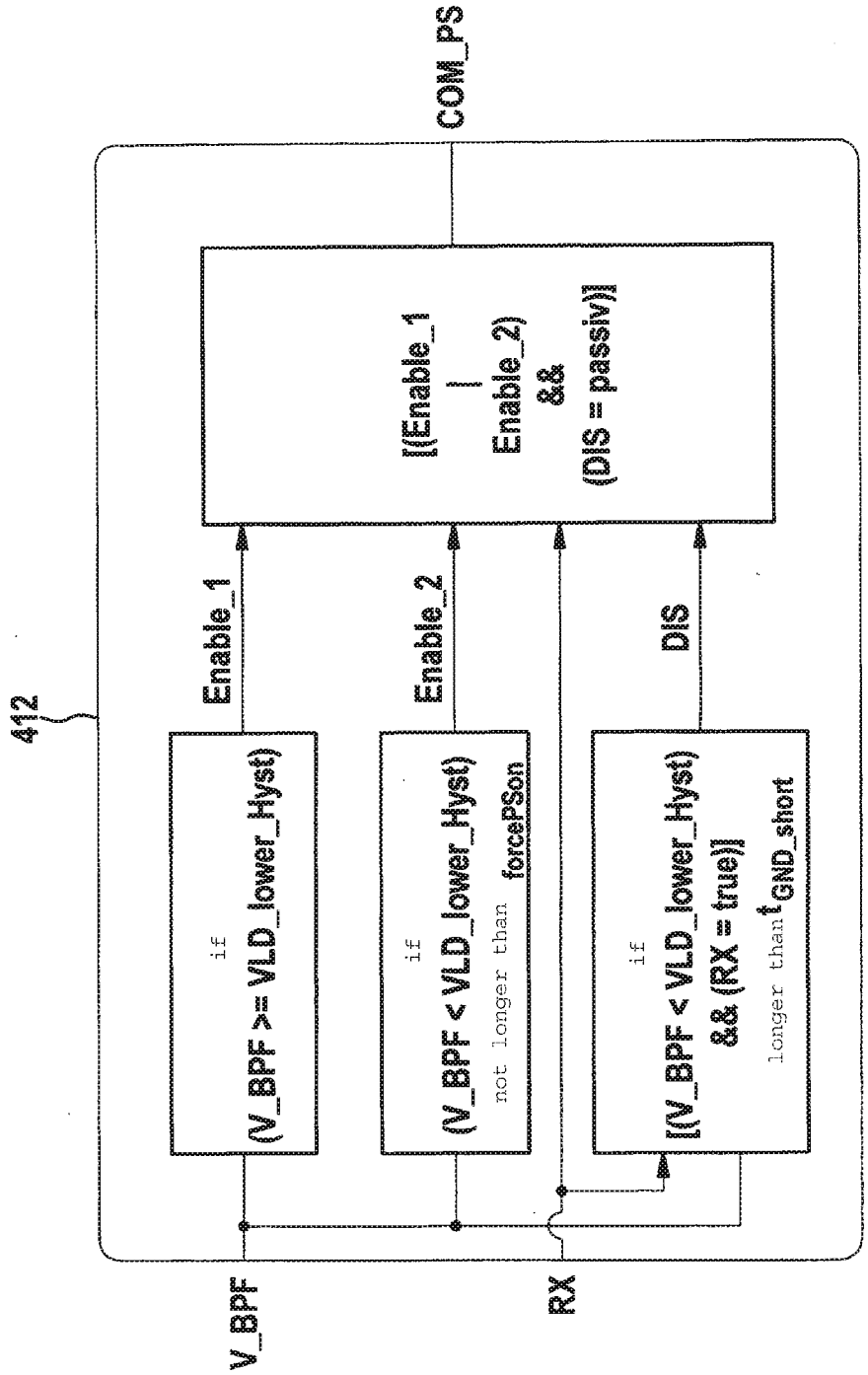

VOLTAGE SURGE PROTECTION FOR ACTIVE RECTIFIERS IN THE EVENT OF LOAD SHEDDING

FIELD OF THE INVENTION

The present invention relates to a rectifier module for an active bridge rectifier including an arrangement for protection from voltage surges in the event of load shedding, an active bridge rectifier including corresponding rectifier modules, a generator array including such a bridge rectifier, a corresponding motor vehicle electrical system, an associated operating method, and an arrangement for implementing this operating method.

BACKGROUND INFORMATION

Rectifiers of different designs may be used for supplying DC systems from AC systems. In motor vehicle electrical systems, bridge rectifiers in a six-pulse version are frequently used in accordance with the three-phase AC generators typically installed therein. The present invention is similarly suitable, however, for bridge rectifiers for other numbers of phases, for example, for four-phase or five-phase generators.

One critical operating condition in the case of bridge rectifiers is load shedding (load dump). This occurs if, in the case of a highly excited generator and a correspondingly high emitted current, the load on the generator or the bridge rectifier connected thereto (for example, due to shutdown of consumers) is reduced suddenly and the load cannot be sustained by capacitively acting elements in the DC voltage network (for example, the battery in the motor vehicle electrical system). In this case, as a result of the energy which was not dissipated in the generator, a high voltage could still be supplied into the motor vehicle electrical system via the bridge rectifier connected to the generator, in the extreme case up to a period of approximately 300 ms to 500 ms. This energy therefore generally has to be able to be sustained in the bridge rectifier to protect electrical components in the motor vehicle electrical system from damage caused by voltage surges. This is generally carried out in passive bridge rectifiers by the rectifier Zener diodes installed therein, in which the voltage surge may be clamped and the excess energy may be converted into heat.

As explained in DE 10 2009 046 955 A1, for example, the use of active bridge rectifiers is desirable in motor vehicles, because, among other things, they have lower power losses in comparison to passive or uncontrolled bridge rectifiers. Presently available activatable or active switching elements for such active bridge rectifiers, for example, MOSFETs, do not have an integrated clamp function with sufficient robustness and are not able to sustain the voltage surge. Therefore, additional protection strategies are required in active bridge rectifiers.

In the event of load shedding, for example, the generator phases may be short-circuited by briefly switching all switching elements of the upper or lower rectifier branch into the conductive state, as discussed, for example, in DE 198 35 316 A1 and discussed in DE 10 2009 046 955 A1. This takes place in particular on the basis of an analysis of the output voltage applied to the DC voltage terminals of the active bridge rectifier. If it exceeds a predefined upper threshold value, a corresponding short-circuit is initiated and the output voltage drops. If the output voltage thus falls below a predefined lower threshold value, the short-circuit is canceled and the output voltage rises again. It is therefore typical hysteresis behavior. The output voltage therefore essentially swings between the upper and the lower threshold values in the event of load shedding.

Problems may arise here in so-called decentralized active bridge rectifiers, in which the individual half-bridges each have independent control circuits, which each detect the output voltage individually. Such half-bridges including independent control circuits are also referred to within the scope of this application as rectifier modules or phase modules. Since certain tolerances are unavoidable in these control circuits, different switching behavior may take place in the individual half-bridges, as explained below. This relates in particular to control circuits which are implemented with the aid of application-specific integrated circuits (ASICs). Individual switching elements in the active bridge rectifier may be significantly overloaded by the differing switching behavior, which may result in thermal destruction of the corresponding switching elements and a failure.

The demand therefore exists for improved protection strategies for active bridge rectifiers in the event of load shedding.

SUMMARY OF THE INVENTION

Against this background, the present invention introduces a rectifier module for an active bridge rectifier including an arrangement for protection from voltage surges in the event of load shedding, an active bridge rectifier including corresponding rectifier modules, a generator array including such a bridge rectifier, a corresponding motor vehicle electrical system, an associated operating method, and an arrangement for implementing this operating method having the features of the independent patent claims.

As mentioned, the present invention relates to the operation of a generator array including an active bridge rectifier in the event of load shedding. As explained, such operation may include conductively connecting (short-circuiting) the generator phases or the AC voltage terminals of the active bridge rectifier corresponding thereto by simultaneously activating (and therefore simultaneously interconnecting) either all lower or all upper activatable or active switching elements of a rectifier branch, and to in turn simultaneously again canceling respective short-circuits. Phase short-circuits are thus induced and canceled.

In the mentioned, decentralized active bridge rectifiers, in which the individual half-bridges each include independent control circuits, which each individually detect the output voltage applied to the DC voltage terminals of the active bridge rectifier, such operation is also sought, but is not always achieved in the related art due to the above-explained tolerances in the voltage recognition and/or in downstream elements of the control circuits. In contrast, the measures according to the present invention enable such operation.

Due to the mentioned tolerances, it may occur that the control circuit of one half-bridge only switches into the conductive state at a higher voltage value of the output voltage than all other half-bridges. A higher upper threshold value therefore effectively results in this control circuit in spite of identical specification in all half-bridges.

This also applies accordingly for the lower threshold value, i.e., the control circuit of one half-bridge only resumes normal operation at a lower voltage value of the output voltage than all other half-bridges and therefore effectively has a lower threshold value in spite of identical specification in all half-bridges.

The last-explained case has proven to be particularly critical. Because the control circuits of all other half-bridges resume the normal operation before the control circuit having the effective lower threshold value, the output voltage rises again. The control circuit having the effective lowest threshold value may therefore never detect an output voltage below this effective lowest threshold value. The correspondingly activated switching element therefore permanently remains switched in the conductive state.

Under certain circumstances, individual phases thus resume the normal rectification, while others permanently remain in the conductive state. As the case may be, yet others never reach the permanently conductive state. This behavior results in an asymmetry of the resulting phase currents, as illustrated in FIG. 2 explained below. As a result of this, individual switching elements in the rectifier may be significantly overloaded, which may result in thermal destruction of the corresponding switching elements. Premature failure of the active bridge rectifier or insufficient limiting of the voltage surges caused by the load shedding is therefore possible.

As is generally known, an active bridge rectifier has half-bridges, the particular switching elements of which define an upper and a lower or high-side and low-side rectifier branch. In each case, a connection of one or multiple AC voltage terminals to a positive DC voltage terminal may be established with the aid of the switching elements situated in the upper or high-side rectifier branch and a connection of one or multiple AC voltage terminals to a negative DC voltage terminal may be established with the aid of the switching elements situated in the lower or low-side rectifier branch. Each half-bridge thus includes two activatable switching elements, which are connected in series between the two DC voltage terminals, and between which one of the AC voltage terminals is connected in each case.

With the aid of the AC voltage terminals, the active bridge rectifier is connected to a corresponding number of generator phases, the DC voltage terminals supply a DC voltage vehicle electrical system. The positive DC voltage terminal is also identified with B+. The negative DC voltage terminal, also identified with B−, may be at ground in particular. An output voltage, which may correspond to the vehicle electrical system voltage of a connected vehicle electrical system, is applied to the DC voltage terminals during rectifying operation of the active bridge rectifier. It shall be understood that active bridge rectifiers may accordingly also be operated as inverters, for example, in hybrid vehicles. Such operating phases are not considered here. However, it shall be understood that when a generator is referred to within the scope of this application, in this case, it may also be an electric machine which is operable both as a generator and as a motor. This also applies accordingly to the active rectifier, which may also be operable as an inverter in corresponding operating phases.

The present invention relates, as previously mentioned, to a so-called decentralized bridge rectifier, in which each half-bridge includes a control circuit. In this way, a rectifier module for an active bridge rectifier is formed in each case, which includes two switching elements connected in series between two end terminals, between which a center tap is formed. The two end terminals correspond, in the installed state of the rectifier module, to the DC voltage terminals of the active bridge rectifier, the center tap corresponds to one of the AC voltage terminals. The following explanations relate, for example, to an active bridge rectifier, which is constructed from corresponding rectifier modules, so that the statements with respect to the AC voltage terminals may also relate to the end terminals of the rectifier modules and the statements with respect to the AC voltage terminals may also relate to the center taps of the rectifier modules. The control circuit includes, according to the present invention, a monitoring unit, a synchronization unit, and a control unit, and is configured as a protective circuit for protecting a vehicle electrical system in the event of load shedding.

The monitoring unit is configured according to the present invention for detecting a measuring voltage and outputting a request signal when the measuring voltage exceeds an upper threshold value. The request signal is output until further conditions are provided or for a predefined period of time, as explained in greater detail hereafter. It is thus turned on due to the exceedance of the upper threshold value and turned off again later, but is not turned off again solely by subsequently falling below the upper threshold value.

The synchronization unit is configured to output a synchronization signal at a synchronization terminal, which is connectable to a synchronization line and, if the rectifier module is used in a corresponding active bridge rectifier, is connected to such a synchronization line, as long as the above-explained monitoring unit outputs the request signal, and otherwise to monitor the synchronization terminal for a synchronization signal, which is possibly applied to the synchronization line during usage of the rectifier module in an active bridge rectifier, because it is output by another synchronization unit.

The request signal may be output in different specific embodiments of the present invention until the measuring voltage falls below a lower threshold value and/or until a minimum time has elapsed and/or a power source for supplying the rectifier module or corresponding control circuits of the individual half-bridges may no longer be recharged, as explained below. When the rectifier module is used in a corresponding active bridge rectifier, the measuring voltage is formed by the output voltage applied between the two DC voltage terminals and is measured at the positive DC voltage terminal.

The control unit is finally configured to switch one of the two switching elements into the conductive state at least temporarily during an activation period of time when the monitoring unit outputs the request signal and/or when the synchronization signal is detected and is optionally recognized as valid by the monitoring unit based on the monitoring of the synchronization terminal. The activation period of time may correspond to the entire period of time, during which the monitoring unit outputs the request signal and/or during which the monitoring unit detects the synchronization signal and has optionally found it to be valid based on the monitoring of the synchronization terminal. However, the activation period of time is advantageously limited by or to a maximum period of time, which is to be selected as greater than a predefined minimum time of, for example, 500 ms.

If the phase short-circuit caused by the request signal is maintained for the minimum time of, for example, 500 ms or more, the output voltage applied between the DC voltage terminals (for example, measured at positive DC voltage terminal B+) collapses to a value of (nearly) 0 V. The control logic (for example, an ASIC) and the power switch (for example, a MOSFET) of the control circuits of the half-bridges therefore have to be supplied from another power source, typically from a capacitor. Such capacitors are typically included, for example, as so-called bootstrap capacitors in a corresponding rectifier circuit or in corresponding rectifier modules.

If a minimum time of, for example, 500 ms or more is thus required for a phase short-circuit, corresponding dimensioning of the capacitors is necessary to ensure the supply of the control logic and the power switch in the case of a correspondingly low voltage during the phase short-circuit. Conventionally installed capacitors are not configured for the special case of load shedding, but rather for normal rectifier operation, however. During normal rectifier operation, however, a corresponding capacitor only has to be able to supply the control logic and the power switch for one half-wave. Without further measures, corresponding capacitors could therefore only ensure a power supply for less than 10 ms, which is not sufficient for load shedding.

The approach according to the present invention may also be able to be implemented using capacitors which are dimensioned relatively small—and are only configured for rectifier operation—they may be recharged during the load shedding.

For this purpose, it may be provided that each control unit and therefore each rectifier module monitors the voltage applied to the particular capacitor. If it falls below a defined value, for example, below 8 V, the control unit of this rectifier module deactivates the phase short-circuit of only its switching element. The synchronization signal remains unaffected thereby. In this way, this rectifier module changes back into normal rectifier operation and raises the voltage potential again between the DC voltage terminals.

It may be provided that the capacitors of all control units are supplied via the DC voltage terminals (or positive DC voltage terminal B+). The capacitors of the other modules may therefore also be recharged by the deactivation of the phase short-circuit of the only one rectifier module (in the case of recognizing an excessively low voltage at the capacitor thereof).

If the voltage at the capacitor reaches an upper limit, for example, 12 V, the (individually canceled) phase short-circuit may be reinitiated. In addition, the voltage applied between the DC voltage terminals may also be monitored and a shutdown may be carried out as a function of this voltage. In this way, only short voltage rises result, which do not have the consequence that, for example, the excitation field of a connected generator may be supplied. The excitation field is therefore reduced further. It is also ensured by the earlier shutdown at relatively low voltages that high voltages do not arise in the vehicle electrical system.

If the capacitors are thus only supplied from the DC voltage terminals, the rectifier modules always have to briefly cancel the phase short-circuit again independently of one another, to recharge the capacitors thereof.

If the voltage is no longer sufficient overall for recharging the capacitors, the short-circuit may be canceled again overall. Specifically, if the excitation field has already decayed so much before expiration of the explained minimum time that the voltage at the capacitors may no longer be kept above the particular threshold, for example, 8 V, all rectifier modules will gradually recognize the undervoltage at their capacitors and will individually deactivate the phase short-circuit of their particular switching element. Therefore, increasingly more phases or phase modules change into active rectifier operation. If this is also not sufficient for charging the capacitors, it may thus be evaluated as the end of the load shedding event, i.e., the excitation field of the generator has decayed enough that a critical voltage no longer occurs even without a countermeasure. This therefore results, possibly even before expiration of a predefined period of time, in a withdrawal of the synchronization signal, since the circuit elements are no longer supplied with voltage. This behavior therefore makes it possible that the circuit no longer has to be supplied unnecessarily by further complex support measures.

The switching element which is switched into the conductive state at least temporarily by the control unit in the activation period of time is that switching element which is provided for initiating or canceling a corresponding phase short-circuit. The particular other switching element is not switched into the conductive state in the event of load shedding, however. The present invention is described hereafter predominantly with reference to the corresponding control of a switching element in the lower or low-side rectifier branch, but may also be used in the same way for control of a corresponding switching element in an upper or high-side rectifier branch.

During regular operating phases (not considered separately here) of a corresponding rectifier module, i.e., when no load shedding is present, all switching elements are operated as rectifiers, i.e., activated using a clocked control signal, as is typically used for activating a corresponding bridge rectifier during normal rectifier operation. This control signal may also be provided by a higher-order control unit, the particular control circuit optionally being configured to relay the control signal provided by the control unit to the switching elements.

The present invention achieves, by way of the above-mentioned measures and the measures still to be explained hereafter, a synchronization of the control circuits of the individual half-bridges, which enables simultaneous or nearly simultaneous (i.e., for example, at a time interval of a few microseconds) switching into the conductive state of all switching elements which are to participate in a phase short-circuit and also to cancel out this switching to be conductive simultaneously or nearly simultaneously. The phase short-circuit may therefore be initiated and canceled in an appropriately short time. In particular the above-explained situations are thus reliably prevented, in which a control circuit either never recognizes a phase short-circuit or never cancels the phase short-circuit.

This synchronization is achieved according to the present invention by providing the synchronization units in the control circuits of the individual half-bridges and optionally the joint synchronization line connecting them in an active rectifier. In principle, any type of electrical information may be exchanged between the synchronization units via these synchronization units and the synchronization line.

A synchronization and a communication may basically be differentiated here. The synchronization line is primarily used for the purpose of synchronization. The synchronization strategy is a central aspect of the present invention. As an additional aspect, it may be provided that the synchronization line is used simultaneously as a communication line (for example as a LIN), to enable a diagnosis and to close security gaps of the control method. Only one additional communication control unit in the rectifier module is required for this purpose. It is advantageous in this case that a diagnosis of the errors in the individual rectifier module and the transmission to the higher-order system or vehicle system are enabled. In the event of load shedding, the synchronization line is in particular exclusively used for synchronization, however. The communication, for example, a LIN function, may only be activated if the voltage level between the DC voltage terminals lies below the lower threshold.

With the aid of the measures provided according to the present invention, undesirable or unintentional phase short-circuits are also reliably prevented in the event of errors or interruptions in the synchronization units or the synchronization line. No function of the control circuits of the individual half-bridges is negatively influenced by the additional synchronization unit and its function. This means, among other things, that the control circuits may also be used, at least during emergency operation, without the measures according to the present invention and also do not display any disadvantages in relation to conventional control circuits for this purpose.

The synchronization line may be implemented in particular in the form of a wired connection, the synchronization units in the particular control circuits being configured to output synchronization signals to be transmitted via the synchronization line and to receive synchronization signals which are output by other synchronization units to the synchronization line.

The synchronization units are also configured for the purpose of receiving the request signal from a monitoring unit of the associated control circuit, which is output, for example, based on the explained threshold value comparison of the output voltage, and which is also provided in conventional control circuits. The request signal signals that the switching element provided for this purpose is to be put into the conductive state, and is applied as long as this conductive state is to be maintained, i.e., until the output voltage falls below the mentioned lower threshold value and/or as long as a maximum request period of time is not yet reached. The actual activation of the switching elements used takes place with the aid of the control signal of the control circuit, which is in turn limited to a minimum period of time. To preclude malfunctions, the maximum request period of time may be limited, but it must be greater than the minimum period of time.

If a corresponding request signal from the monitoring unit of the associated control circuit is received, and a synchronization signal has not yet been received via the synchronization line, the particular synchronization unit outputs a corresponding synchronization signal on the synchronization line. This signal may be a logical one in this case, for example, which is applied to the synchronization line. The synchronization signal is output as long as the monitoring unit does not cancel the request signal. At the same time, the particular switching element provided for this purpose is put into the conductive state via the control circuit or with the aid of a control unit.

The control circuits of the other half-bridges, or their synchronization units, which have generally not yet received a separate request signal, receive the synchronization signal transmitted via the synchronization line and evaluate it. If this evaluation has the result, for example, within the scope of a plausibility check, which is optional, however, that a phase short-circuit is to be initiated, the control circuits of the other half-bridges put the particular switching element provided for this purpose into the conductive state, optionally with the aid of a control unit. The initiation of the phase short-circuit is accordingly synchronized with the aid of the synchronization signal. The time elapsing in this case is determined solely according to the duration of the transmission of the synchronization signal and optionally the time which is required for the mentioned plausibility check.

In addition, however, the corresponding synchronization signal, for example, the mentioned logical one, is also output by the control circuits of the other half-bridges or their synchronization units, and here likewise as long as the particular control circuits of the other half-bridges output the request signal.

Immediately after the exchange of the synchronization signal, or directly after the initiation of the phase short-circuit, all control circuits or their synchronization units therefore output a corresponding synchronization signal to the synchronization line. For example, a logical one is applied to each of the communication terminals of the synchronization units of all control circuits on the synchronization line.

In the simplest case, the synchronization signal is output until the expiration of the maximum request period of time or also only until it is recognized that a supply voltage of a capacitor is no longer sufficient (see above). However, the present invention may also provide for using a lower threshold value of the voltage applied to the DC voltage terminals.

If this output voltage decreases again due to the phase short-circuit, in a particularly advantageous specific embodiment of the present invention, the control circuit or the corresponding monitoring unit having the effective highest lower threshold value detects it. The output of the above-explained request signal to the associated synchronization unit is therefore ended. As a result thereof, this synchronization unit also ends the output of the synchronization signal to the synchronization line. However, since the other control circuits still output a corresponding synchronization signal to the synchronization line, because the value has not yet fallen below the (effectively lower) lower threshold value there, the first switching elements of all half-bridges remain in the conductive state. In other words, the switching elements, which were switched to be conductive, of all half-bridges remain in the conductive state as long as at least one of the control units still outputs a synchronization signal.

A synchronization signal is no longer applied to the synchronization line only when the last monitoring unit, i.e., the monitoring unit having the effectively lowest lower threshold value, has also detected a fall below the lower threshold value by the output voltage. Only then are the switching elements, which were switched to be conductive, again operated in normal rectifier operation (i.e., activated using the first control signal). This in turn takes place until one of the monitoring units detects an exceedance of the upper threshold value, thereupon outputs the first control signal, etc.

Special advantages of the measures provided according to the present invention are explained briefly hereafter.

The synchronized initiation of the phase short-circuit is implemented according to the present invention without prior establishment of a communication master and a corresponding slave. All control circuits or their synchronization units and thus all rectifier modules may therefore be configured identically. Depending on the particular tolerances, the control circuit or the synchronization unit acts as a communication master for the activation of the phase short-circuit or initiates the synchronization, at which the associated monitoring unit has the lowest upper threshold value. It is therefore ensured that the phase short-circuit cannot be activated excessively late as a result of the tolerance of an individual control circuit or an individual monitoring unit and therefore a voltage surge cannot be kept below a defined limit.

The synchronized cancellation of the phase short-circuit is only initiated in the above-explained specific embodiment by the control circuit, whose monitoring unit has the lowest lower threshold value. The associated synchronization unit becomes the synchronization master for cancellation in this regard. The other control circuits, which represent the slaves in this case, may not independently cancel the permanent conductive state of the switching element which is switched into the conductive state, even if the value falls below the lower threshold value of the particular monitoring unit.

As mentioned, the synchronization signal which is applied via the synchronization line may be checked for plausibility by the evaluation. For example, it may be provided that a corresponding synchronization signal is not accepted as long as the output voltage does not exceed the lower threshold value in the associated monitoring unit. A faulty synchronization signal may be blanked out in this way.

The evaluation of the synchronization signal applied via the synchronization line may also be carried out in a form by which, for example, an error caused by a short-circuit of the synchronization line to ground (or the negative DC voltage terminal) may be recognized and it is possible to react adequately thereto. For example, it may be provided that if the synchronization signal is applied over more than a predefined period of time, for example, 100 ms, in a normal voltage range of the output voltage, it is no longer accepted for at least the instantaneous travel cycle in the particular control circuit which recognizes it or its synchronization unit. An unintentional phase short-circuit may thus be prevented. In the case of load shedding which subsequently takes place, each control circuit may still individually activate or deactivate the phase short-circuit as in the related art. The control circuits provided according to the present invention therefore also do not have a disadvantage in relation to known control circuits in the event of an error.

In other cases of error, for example, a short-circuit of the synchronization line toward a positive DC voltage terminal of the active bridge rectifier or an interruption of the synchronization line, each individual control circuit may also act individually in the event of load shedding and initiate a phase short-circuit. The control circuits provided according to the present invention therefore also do not have a disadvantage in relation to known control circuits in such cases of error.

An overheating protection in the case of a short-circuit of the synchronization line toward a positive DC voltage terminal of the active bridge rectifier may also be provided, as explained below.

The control circuits configured according to the present invention, or assemblies including such control circuits, may also be installed and used if no synchronization line is physically provided.

The control circuits including the synchronization units, the monitoring units, and the control units, as explained above in detail, may be combined together with the switching elements into an assembly referred to here as a rectifier module. As explained, it includes two switching elements connected to one another in a series connection between two end terminals and a center tap between the switching elements. The end terminals of multiple rectifier modules (corresponding to the number of generator phases of three, four, five, six, etc.) may be connected to one another in series and in this way may form jointly corresponding DC voltage terminals of an active bridge rectifier configured by these rectifier modules. The center taps accordingly form the particular AC voltage terminals.

A generator array including a corresponding bridge rectifier, for example, configured by the mentioned rectifier modules, additionally has a generator including a generator controller. The generator controller has the task of keeping the generator voltage constant in the event of variable speed and vehicle electrical system load, by setting the exciting current, for example, with the aid of pulse width modulation, according to a generator setpoint voltage. The output voltage between the DC voltage terminals of the associated active bridge rectifier, which has been mentioned several times, is used as the actual value. The generator setpoint voltage is either a function of the intake air temperature or may be specified via an interface. The reason for the temperature-dependent specification of the generator setpoint voltage lies in the chemical properties of the battery. By variable specification of the generator setpoint voltage, the battery charge may be improved at low temperatures and overcharging of the battery may be avoided at high temperatures at the same time.

If a phase short-circuit is initiated in the event of load shedding, as explained above, depending on the selection of the deactivation threshold for the phase short-circuit, this may have the result that the generator controller detects an output voltage which is lower than the generator setpoint voltage. This is recognized in the generator controller as undervoltage. To counteract the undervoltage, the generator controller will increase the excitation field, which in turn has the result that the phase short-circuit cannot be canceled, because the lower threshold values, which were mentioned several times above, are not reached. The generator thus does not return to the normal generator operation, since the above-explained load shedding protection function works against the function of the generator controller. The generator may thus be damaged.

One advantageous refinement of the present invention therefore provides that the generator controller also participates in the explained synchronization. In the case of the generator controller, a synchronization interface having the above-explained joint synchronization line of the control circuits of the individual half-bridges of the active bridge rectifier may therefore be provided.

If a synchronization signal applied to the synchronization line is detected via the synchronization interface, and it may optionally be checked for plausibility as explained above, for example, the voltage supply of the excitation field of the generator may be turned off for a defined period of time, so that the exciting current decays. The generator itself may also be turned off. Turning off the voltage supply for the excitation field for a defined period of time may include turning off a corresponding generator controller, turning off the entire supply voltage of the controller, controlling the exciting current on the basis of a reduced generator setpoint voltage, and/or setting the exciting current to a predefined value.

The defined period of time for which the exciting current is reduced may correspond to the period of time over which the synchronization signal is applied to the synchronization line, or may be fixedly predefined and may be directed to typical periods of time which are required to compensate for load shedding.

If, in the event of load shedding, the phase short-circuit is maintained for a specific minimum time of, for example, 500 ms or until it is no longer possible to recharge the supply capacitor (see above), the excitation field thus also may no longer be supplied with power, which inherently has the result that the excitation field decays and the generator eventually dies down, even if the controller recognizes the undervoltage and turns on the corresponding field output stage.

The features explained within the scope of this application and the advantages thus achievable relate to the active bridge rectifier according to the present invention, the generator array according to the present invention, the motor vehicle electrical system according to the present invention, the operating method according to the present invention, and the arrangement according to the present invention which are configured for implementing this operating method. A processing unit according to the present invention, for example, a control unit of a motor vehicle or a rectifier controller is configured, in particular by programming, to carry out a method according to the present invention.

The implementation of the method in the form of software is also advantageous, since it involves particularly low costs, in particular if an executing control unit is also used for other tasks and is therefore present anyway. Suitable data carriers for providing the computer program are in particular diskettes, hard drives, flash memories, EEPROMs, CD-ROMs, DVDs, etc. A download of a program via computer networks (Internet, intranet, etc.) is also possible.

Further advantages and embodiments of the present invention result from the description and the appended drawings.

It shall be understood that the above-mentioned features and the features to be explained hereafter are usable not only in the particular specified combination but rather also in other combinations or alone, without departing from the scope of the present invention.

The present invention is schematically shown on the basis of an exemplary embodiment in the drawings and will be described in greater detail hereafter with reference to the drawings.

In the figures, identical or corresponding elements are indicated with identical reference numerals. A repeated explanation is omitted.

BRIEF DESCRIPTION OF THE DRAWINGS

FIG. 4 shows a plausibility check circuit according to one specific embodiment of the present invention in a schematic view.

DETAILED DESCRIPTION

Figure 1A:
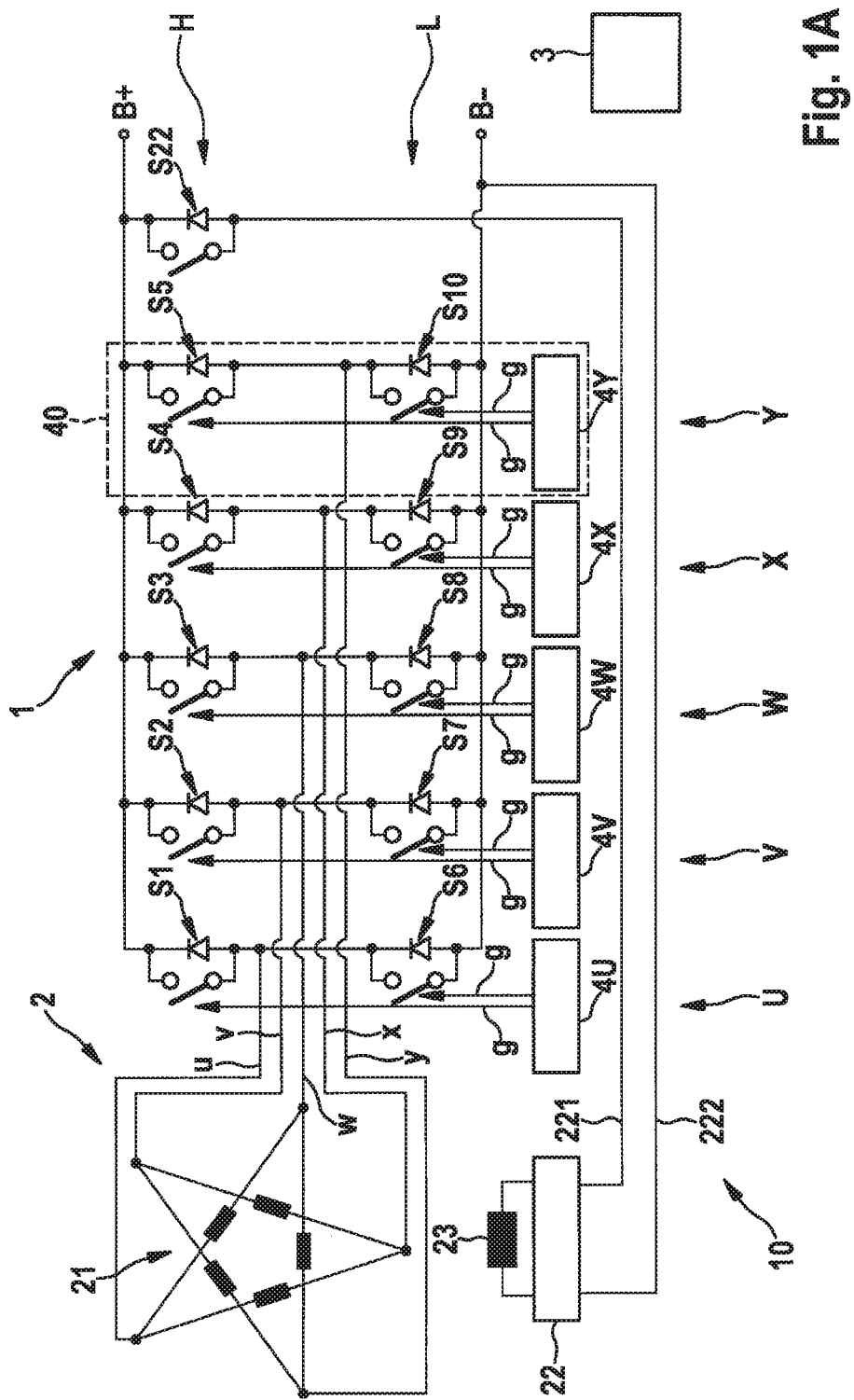
FIGS. 1A, 1B and 1C show generator arrays including active bridge rectifiers and the function thereof in schematic views.
Figure 1B:
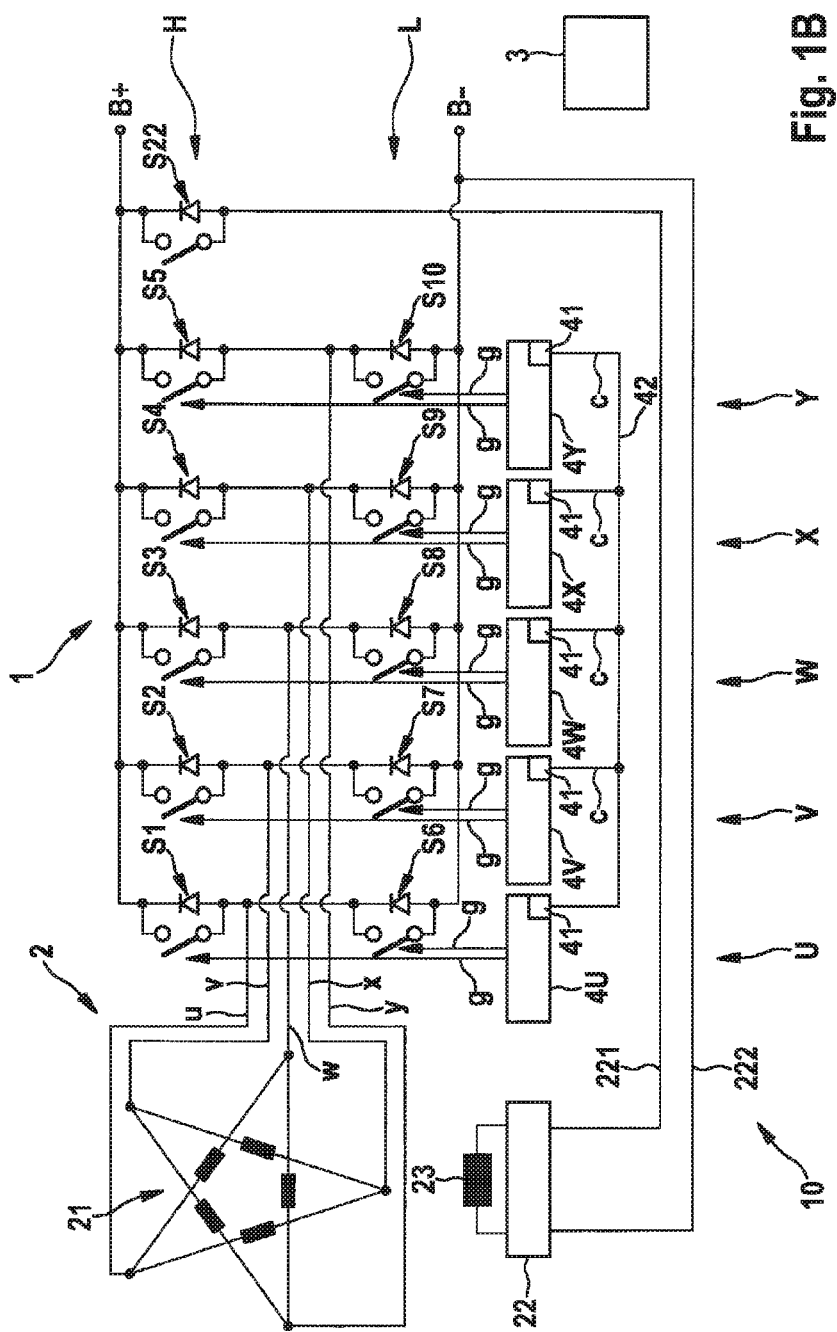
Figure 1C:
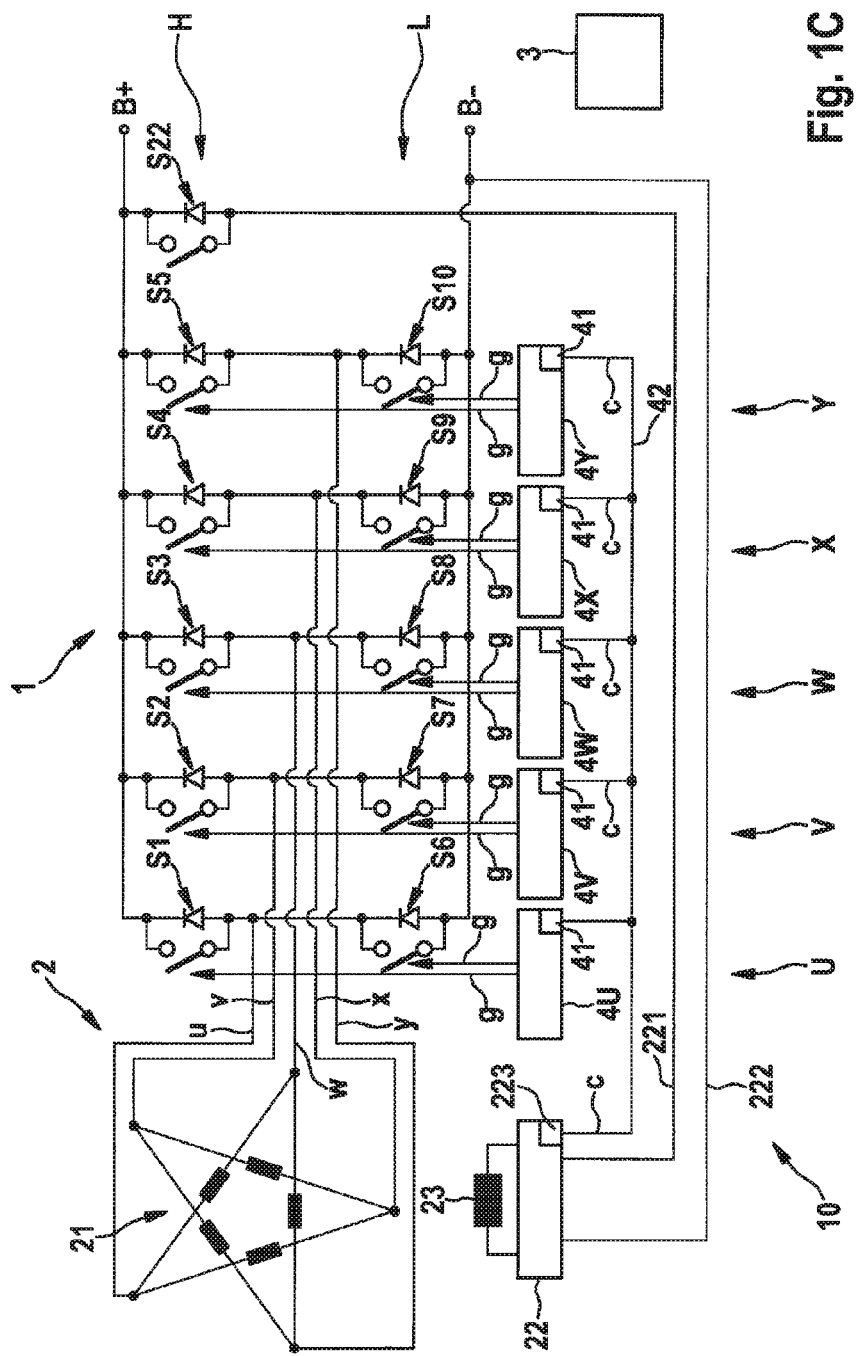

FIGS. 1A through 1C show generator arrays including active bridge rectifiers and the function thereof in schematic views. The generator arrays are each identified as a whole with reference numeral 10. They each include an active bridge rectifier 1 including five half-bridges U through Y here, for example. The five half-bridges U through Y may each be configured as corresponding rectifier modules, as illustrated here only with respect to rectifier module 40 in FIG. 1A (half-bridge Y) for the sake of clarity. Generator arrays 10 furthermore include a five-phase generator 2 here, for example.

The five half-bridges U through Y are each incorporated between the two DC voltage terminals B+ and B− of active bridge rectifier 1, each half-bridge U through Y having two activatable switching elements, which are connected in series between the two DC voltage terminals B+ and B−, and are identified here with S1 through S10. Switching elements S1 through S10 are illustrated as switches having diodes connected in parallel, in reality, however, they are configured as MOSFETs, for example. The diode illustrates the so-called body diode. In the reverse direction, the MOSFETs behave like a diode when they are not activated. An AC voltage terminal u through y is connected in each half-bridge in each case between switching elements S1 through S10, each of AC voltage terminals u through y corresponding to one generator phase of generator 2. The two DC voltage terminals B+ and B− of active bridge rectifier 1 correspond, for example, to a positive and a negative battery or vehicle electrical system terminal, negative battery or vehicle electrical system terminal also being able to be at ground. Switching elements S1 through S10 are each incorporated in an upper branch H (high-side) and a lower branch L (low-side) of particular half-bridges U through Y.

The AC voltage terminals u through y may be connected, according to a corresponding protective circuit of switching elements S1 through S10, to one of the two DC voltage terminals B+ and B−; a simultaneous activation of both switching elements of a half-bridge U through Y is to be avoided during normal operation, to prevent so-called hot paths between the two DC voltage terminals B+ and B−.

Generator 2 has a stator assembly identified as a whole with reference numeral 21, which is configured here as a star circuit, but may also be provided in another arrangement. The five windings of stator assembly 21 (without identification) are connected to AC voltage terminals u through y.

Generator 2 furthermore has a generator controller 22. Generator controller 22 is configured to set an exciting current through an excitation winding 23, as explained. Generator controller 22 may be connected with the aid of lines 221 and 222 to the two DC voltage terminals B+ and B− and may be supplied via them. Generator controller 22 may also detect a voltage applied between the two DC voltage terminals B+ and B− via these lines 221 and 222 and/or a separate measuring line. A switching element S22 may be provided, with the aid of which generator controller 22 may be disconnected from the two DC voltage terminals B+ and B− (or only positive DC voltage terminal 221).

Switch S22 is not shown with an activation line in the figure. It is possible, for example, to activate it, optionally via a further logic or, if a time controller is used, optionally directly from a synchronization line (see below), if a voltage potential used here is suitable for this purpose.

A control unit 3 may be provided for activating active bridge rectifier 1. In a decentralized active bridge rectifier 1 shown here, however, individual control circuits, identified with 4U through 4Y here, assume at least a part of the required switching tasks of particular half-bridges U through Y. Switching elements S1 through S10 may each be activated via lines g, which are shown by dotted lines, using a control signal, with the aid of individual control circuits 4U through 4Y. In the event of load shedding, for example, this may be a control signal for this purpose which switches all switching elements S1 through S5 in upper branch H (high-side) or all switching elements S6 through S10 in lower branch L (low-side) of particular half-bridges U through Y to be permanently conductive. Another control signal may include an activation pattern for regular rectifier operation, for example, which is specified by control unit 3.

Switching elements of each half-bridge U through Y (i.e., S1/S6, S2/S7, S3/S8, S4/S9, and S5/S-10) are activated during normal rectifier operation in such a way that a current applied to one of the AC voltage terminals u through y of one of the five windings of stator assembly 21 of generator 2 is alternately advanced to one of the two DC voltage terminals B+ and B−. This is regularly carried out in such a way that upon application of a positive half-wave to AC voltage terminals u through y, the particular current is advanced to B+, in contrast, upon application of a negative half wave, the current is advanced to B−. An output voltage at B+ may also be set by corresponding clocking.

Load shedding may be detected in an arrangement shown in FIG. 1A on the basis of a voltage applied to B+. For this purpose, in the illustrated example, individual control circuits 4U through 4Y are configured as also demonstrated below with reference to FIGS. 3A and 3B. Individual control circuits 4U through 4Y are connected via lines (not shown) to at least one of the two DC voltage terminals B+ and B− of active bridge rectifier 1. If a defined upper threshold value of an output voltage applied between the two DC voltage terminals B+ and B− of active bridge rectifier 1 is exceeded, load shedding may be detected.

The activation of active bridge rectifier 1 if load shedding is detected may be carried out in such a way that the phase windings of generator 2, which are each connected via one of AC voltage terminals u through y to half-bridges U through Y of active bridge rectifier 1, are short-circuited in a chronologically defined way. As a result, the current fed into the electrical system drops to zero and the voltage of the vehicle electrical system drops as a result of the intrinsic consumption. A corresponding short-circuit may be created by simultaneously activating and therefore switching switching elements S1 through S5, on the one hand, or S6 through S10, on the other hand, of one rectifier branch H or L into the conductive state. If the short-circuit is canceled, the voltage rises again. This sequence may be used to control the output voltage and/or to dissipate an overvoltage of the generator. As mentioned, this takes place, but not reliably, according to the related art upon use of individual control circuits 4U through 4Y as shown in FIG. 1A. This is illustrated below with reference to FIG. 2. An approach according to specific embodiments of the present invention is illustrated in subsequent FIGS. 1B and 1C and with reference to FIGS. 3A and 3B.

FIGS. 1B and 1C each show arrangements having a five-phase generator 2 and an active bridge rectifier 1 including five half-bridges as shown in FIG. 1A and provided with corresponding reference numerals.

In the example shown in FIG. 1B, control circuits 4U through 4Y each include a synchronization unit 41, which is connected via a synchronization terminal c to a joint synchronization line 42. As explained above and described with reference to FIGS. 3A and 3B, control circuits 4U through 4Y may interchange, for example, by applying a signal, which corresponds to a logical one, to synchronization line 42, or by canceling a corresponding signal. Synchronization units 41 may also be connected, for example, via a serial bus system, to an error diagnosis unit via further terminals (not shown). This is shown in particular in FIG. 3B.

In the example shown in FIG. 1C, generator controller 22 also includes a communication interface 223. If, as mentioned, a synchronization signal applied to synchronization line 42 is detected via communication interface 223 of generator controller 22, and if this signal may optionally be checked for plausibility as explained above, it may be provided that the generator controller turns off the voltage supply for its excitation field for a specific minimum time, so that it decays (for example, via a free-wheeling diode). Alternatively, via an additional logic, which also monitors the synchronization line, the controller may be completely disconnected via switching element S22 from the voltage supply, so that the excitation field decays and the controller also may not readjust.

Figure 2:
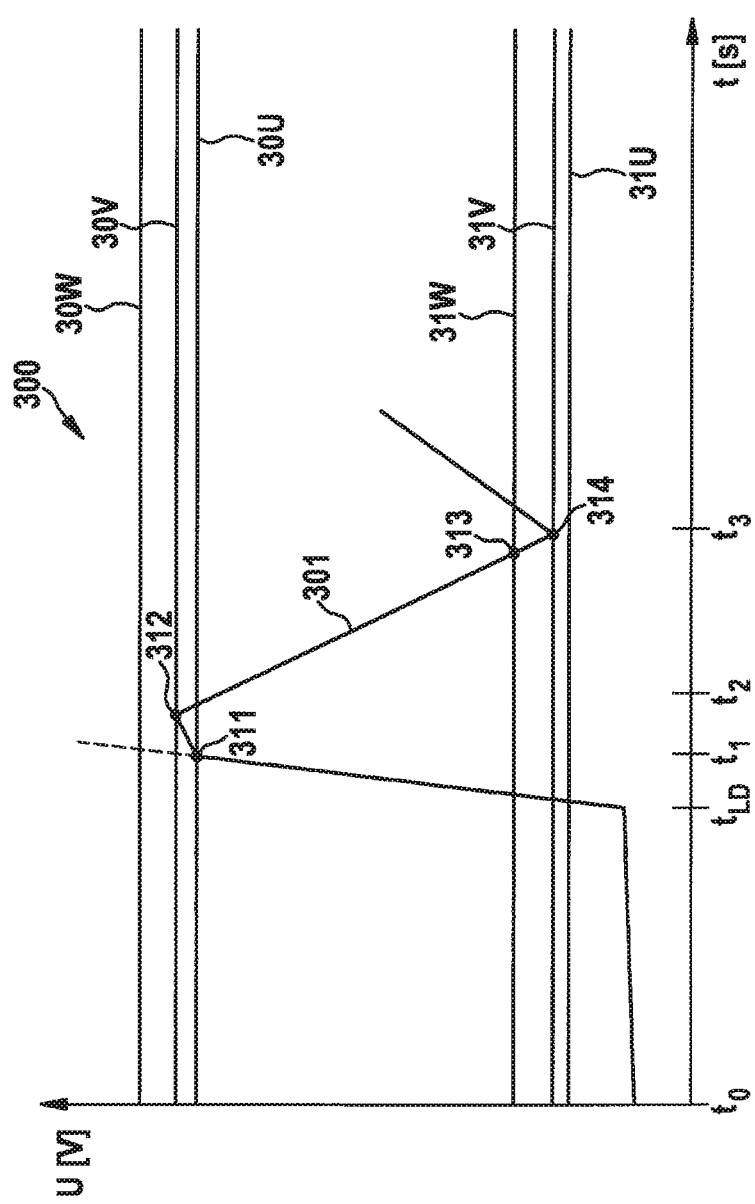
FIG. 2 illustrates asymmetry effects in an active bridge rectifier according to the related art.

Asymmetry effects in an active bridge rectifier according to the related art are illustrated in FIG. 2, whose half-bridges, as explained with reference to FIG. 1A, have individual control circuits without approaches according to the present invention. For the sake of clarity, FIG. 2 relates to a three-phase active bridge rectifier, however, the explanations also apply similarly for a five-phase active bridge rectifier as illustrated in FIGS. 1A through 1C, or an active bridge rectifier having another number of phases.

In FIG. 2, in each case upper (effective) threshold values of the individual control circuits of half-bridges U through W of a corresponding rectifier are identified with 30U through 30W, and the lower (effective) threshold values are accordingly identified with 31U through 31W. It is apparent that the upper and the lower threshold values of the control circuit of half-bridge W, 30W and 31W, are above the threshold values of the control circuit of half-bridge V, 30V and 31V, which are in turn above the threshold values of the control circuits of half-bridge U, 30U and 31U.

A voltage curve 301, as is applied, for example, to a DC voltage terminal of such an active bridge rectifier, for example, DC voltage terminal B+, is plotted as voltage value U in volts in a diagram 300 on the ordinate in relation to a time t in seconds on the abscissa.

Regular operation takes place between points in time t0 and tLD, the voltage value of voltage curve 301 is in a range which is typical in the event of rectification and corresponds, for example, to a setpoint voltage for a vehicle electrical system, for example, 12 V. The corresponding active bridge rectifier is therefore in regular rectifier operation. At a point in time tLD, load shedding takes place, for example, due to switching off of a consumer in the vehicle electrical system. The voltage value of voltage curve 301 rises suddenly.

At a point 311, the voltage value of voltage curve 301 reaches upper threshold value 30U of the control circuit of half-bridge U. The switching element of this half-bridge U provided for this purpose, for example, the low-side switching element, is therefore switched into the conductive state. The voltage rise thus flattens out, but still reaches upper threshold value 30V of the control circuit of half-bridge V at a point 312. The switching element of this half-bridge V provided for this purpose is thus also switched into the conductive state. As a result of this, the voltage value of voltage curve 301 drops. Upper threshold value 30W of the control circuit of half-bridge W, 30W, is therefore no longer reached, so that the corresponding switching element of this half-bridge W, remains in the regular activation, for example, a clocked activation, which it also experiences between points in time t0 and tLD.

At a point 313, the voltage value of voltage curve 301 reaches lower threshold value 31W of the control circuit of half-bridge W. However, since it has not previously initiated a conductive state of the corresponding switching element, no change results here.

At a point 314, however, the voltage value of voltage curve 301 reaches lower threshold value 31V of the control circuit of half-bridge V. The control circuit 4U of half-bridge V now cancels the permanently conductive state of the corresponding switching element and returns to regular activation, for example, a clocked activation, which also takes place between points in time t0 and tLD, so that only the switching element activated by the control circuit of half-bridge U still remains in the permanently conductive state.

However, since only this one switching element is switched into the permanently conductive state, the voltage value of voltage curve 301 increases again. The switching element activated by the control circuit of half-bridge U therefore may no longer reach regular activation, since lower threshold value 31U is no longer reached. The switching element activated by the control circuit of half-bridge U is thus excessively strongly loaded.

Figure 3A:
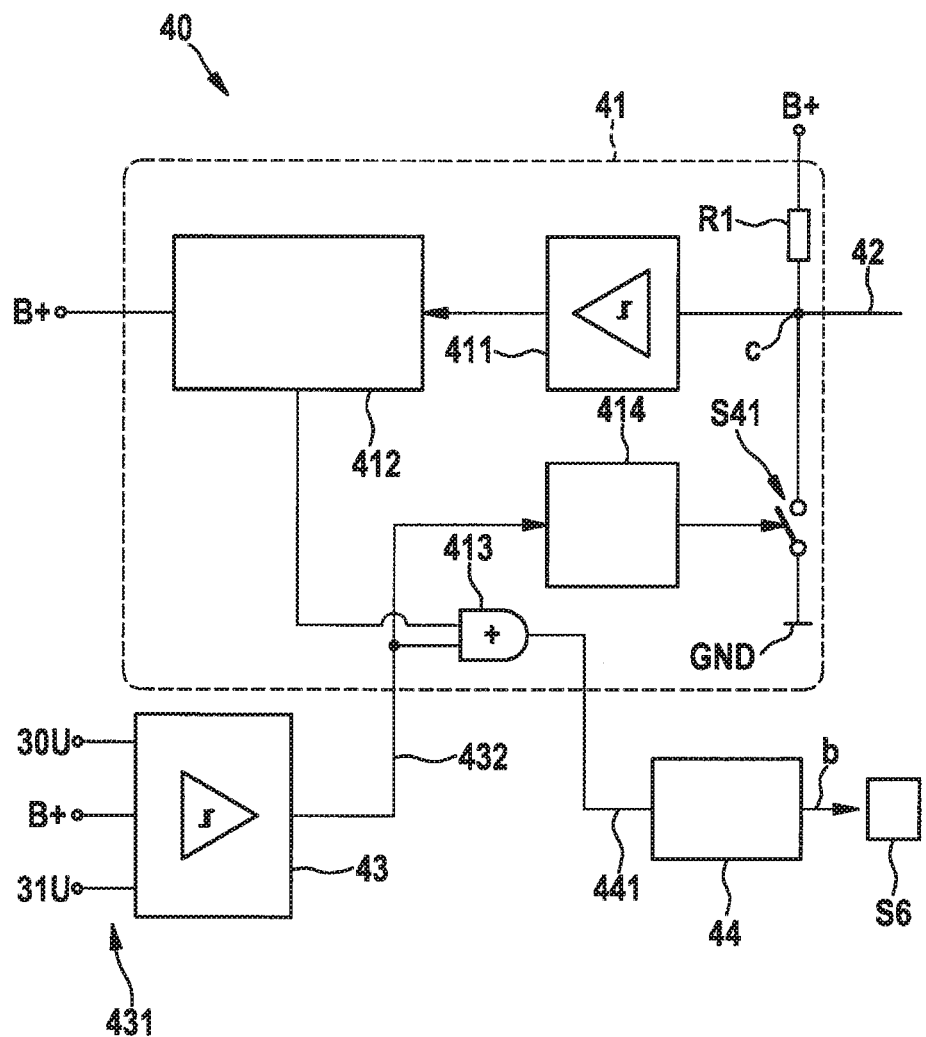
FIGS. 3A and 3B show control units according to the related art and according to one specific embodiment of the present invention in a schematic view.
Figure 3B:
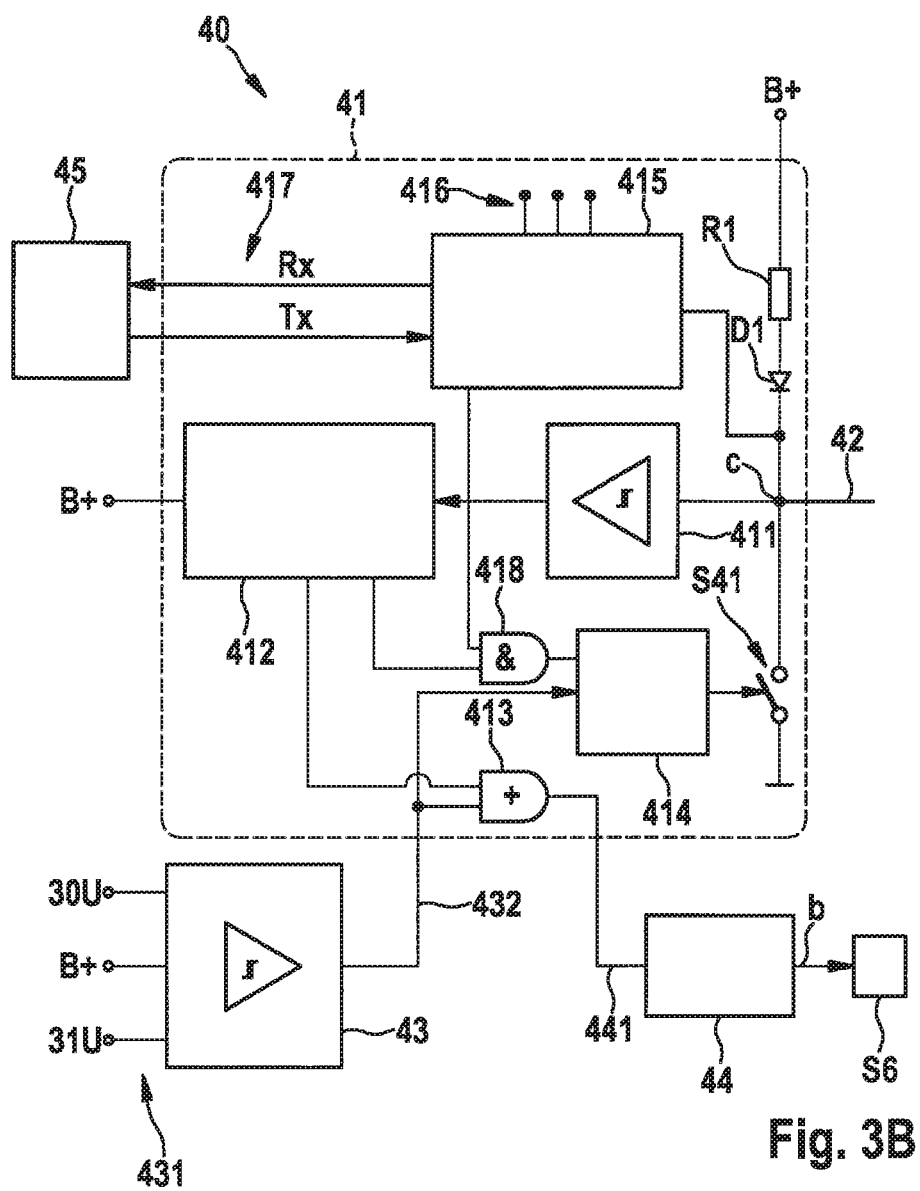

Rectifier modules 40 provided for achieving this object are partially shown in FIGS. 3A and 3B, as may be used for all half-bridges U through Y of a corresponding active rectifier 1, as is shown, for example, in FIGS. 1A through 1C. Not all components of a corresponding rectifier module are shown; for example, only one switching element S6 is shown. Synchronization unit 41 is shown enclosed by dashed lines in each case here. As mentioned, it is connected to synchronization line 42 via a synchronization terminal c.

A monitoring unit, which is provided in each case, is identified with reference numeral 43. In the example shown, it includes three inputs 431, the input shown in the middle here being connected to positive DC voltage terminal B+ of active bridge rectifier 1 and the terminals shown at the top and bottom being configured to specify the particular upper and lower threshold values, for example, 30U and 31U (cf. FIG. 2). If a signal is applied to positive DC voltage terminal B+ of active bridge rectifier 1, which exceeds upper threshold value 30U, a request signal, for example, a logical one, is output at one OR gate 413 of synchronization unit 41 via an output 432 of monitoring unit 43.

A shutdown delay may be integrated into monitoring unit 43 or at the output thereof, i.e., a block which immediately advances a logical one of monitoring unit 43, for example, but carries out a switch-back to a logical zero with a time delay, however.

OR gate 413 of synchronization unit 41 outputs a corresponding signal, for example, also a logical one, as a result of this via an output 441 to a control module 44, which is configured to continuously activate the particular switching element provided for this purpose, for example, switching element S6 in half-bridge U, as long as a corresponding signal is output via output 441 of OR gate 413 of synchronization unit 41. It shall be understood that further signals may also be output to a corresponding switching element S6 and the particular other switching element in a corresponding half-bridge, switching element S1 in half-bridge U here, for example, a clocked signal, which is provided by a control unit 3 during normal rectifier operation.

If a signal is applied to positive DC voltage terminal B+ of the active bridge rectifier, which exceeds mentioned upper threshold value 30U, the request signal, for example, the logical one, is also output via output 432 of monitoring unit 43 to a driver circuit 414 of synchronization unit 41. Driver circuit 414 of synchronization unit 41 causes closing of a switching element S41, whereby a voltage applied via a suitable resistor R1, for example, of positive DC voltage terminal B+ of the active bridge rectifier, is drawn to ground and in this way a corresponding synchronization signal is output to synchronization line 42.

If a signal which no longer exceeds mentioned upper threshold value 30U is applied to positive DC voltage terminal B+ of the active bridge rectifier, the signal previously having exceeded this upper threshold value 30U, however, the request signal, for example, the logical one, is furthermore output via an output 432 of monitoring unit 43, until the signal at positive DC voltage terminal B+ of the active bridge rectifier falls below lower threshold value 31U. As soon as this has taken place, the request signal, for example, the logical one, is no longer output, optionally with a time delay, via output 432 of monitoring unit 43. A logical zero is now applied to output 432 of monitoring unit 43, for example. Switching element S41 is therefore now opened with the aid of driver circuit 414.

However, as long as any arbitrary other synchronization unit 41 (cf. the identically configured control circuits 4U through 4Y in FIGS. 1A through 1C) has not yet fallen below a corresponding lower threshold value (cf. corresponding threshold values 31V and 31W in FIG. 2), a synchronization signal is still applied to synchronization line 42 or synchronization terminal c. This also applies if monitoring unit 43 of control circuit 4U has itself not yet detected an exceedance of upper threshold value 30U of the signal applied to positive DC voltage terminal B+ of the active bridge rectifier, but a corresponding monitoring unit of another control circuit 4V through 4Y has.

The synchronization signal applied to synchronization line 42 is received, for example, with the aid of a receiver circuit 411. A signal output by receiver circuit 411 may be supplied to a plausibility check circuit 412, which carries out a plausibility check, as explained above. If the plausibility check in plausibility check circuit 412 results in a positive plausibility of the synchronization signal applied to synchronization line 42, a corresponding signal, for example, again in the form of a logical one, is output to OR gates 413 and control circuit 44 is thus also prompted to switch corresponding first switching element, S6 here, into the conductive state. The protective circuit of first switching element, S6 here, is only canceled when a corresponding signal is no longer applied to synchronization line 42 and via output 432.

The specific embodiment of control circuit 40 shown in FIG. 3B is expanded in relation to the specific embodiment shown in FIG. 3A. The specific embodiment shown in FIG. 3B offers advantages, because a simply configured and therefore cost-effective monitoring may be carried out hereby by using the hardware already provided for the synchronization according to the present invention. This allows errors to be detected in control circuits 4U through 4Y associated with individual half-bridges U through Y. A corresponding generator array therefore becomes diagnosis capable and in this way meets strict requirements for the onboard diagnosis (OBD) and effectuates a higher level of system security according to ISO 26262, in that an error message is output to a higher-order system, for example, control unit 3. The modularity or flexibility of the active bridge rectifier is nonetheless maintained. Additional functions, for example, wake-up and sleep (power-saving functions) may be centrally activated.

In the specific embodiment of control circuit 4U shown in FIG. 3B, a serial interface 417, for example, a LIN interface, to a corresponding bus system is additionally provided, to which, for example, an error diagnosis unit 45 is connected. Furthermore, an AND gate 418 is provided. The hardware structure and the connections of control circuit 4U remain otherwise unchanged.

Control circuit 4U has a suitable bus controller 415. AND gate 418 may only output a signal to driver circuit 414 when a signal output by plausibility check circuit 412 is applied to its input. This signal signals that a voltage applied to positive voltage terminal B+ is less than a maximum value, for example, less than 16 V in a 12 V network.

A corresponding signal of bus controller 415 is therefore ignored when the voltage applied to positive voltage terminal B+ is greater than this maximum value, for example, 16 V, so that the synchronization of control circuits 4U through 4Y is not disturbed in the event of load shedding. The other bus users also shut down the communication if the voltage is greater than, for example, 16 V.

Synchronization line 42, the signal of which is also supplied to bus controller 415, may be coupled via the latter to an existing synchronization line of a generator controller 22 and activated by a higher-order system, for example, an engine control unit.

Error diagnosis unit 45 may provide or prepare an error message and transmit it via the corresponding bus to the higher-order master system, so that generator controller 22 may optionally be turned off to achieve a secure state.

Each bus controller 415 typically includes three inputs 416 as a specification for an address coding. By way of the combination of the three inputs, to each of which a logical one or a logical zero may be applied, 8 possible user identifiers result for identifying individual users. Therefore, corresponding control units 4U through 4Y may be manufactured uniformly and nonetheless output trackable error messages.

Since a typically used communication protocol is error tolerant, a combination of the explained synchronization and the corresponding bus system is possible. The operating ranges of the two functions are non-overlapping by definition. Even if spontaneous short disturbances occur from the load shedding protective functions, they do not result in a failure of the bus communication. Alternatively, a communication structure may be selected in which a central module is used for communication with the higher-order system and at the same time as a master for control units 4U through 4Y. Further disturbances may be eliminated in this way.

FIG. 4 illustrates the function of a plausibility check circuit according to one specific embodiment of the present invention, for example, plausibility check circuit 412 of FIGS. 3A and 3B.

A signal V_BPF is in this case a filtered voltage signal of a voltage applied to positive DC voltage terminal B+. RX represents a signal from a receiver circuit 411. An output signal COM_PS is relayed to OR gate 413.

Signal Enable_1 becomes active (logical 1) when V_BPF exceeds lower threshold value 31U (identified here with VLD_lower_Hyst). This function prevents the unauthorized request of a phase short-circuit from the synchronization line.

Signal Enable_2 becomes active (logical 1) when V_BPF falls below the lower threshold value 31U (VLD_lower_Hyst) again, but this does not last longer than a defined time (for example, 2 ms). Due to this function, control circuits 4U through 4Y, which function as slaves, may not independently turn off the phase short-circuit, even if there is a fall below the lower threshold value in these control circuits 4U through 4Y or associated monitoring units 43 themselves.

Signal DIS becomes active (logical 1) when signal RX of receiver circuit 411 is active, but V_BPF falls below lower threshold value 31U (VLD_lower_Hyst) and this state has lasted longer than a defined time (for example, 100 ms, tGND_short). A short-circuit of the synchronization line to ground is thus recognized and the unintentional phase short-circuit is forbidden due to the short-circuit error.

Signal COM_PS assumes the same value as signal RX from receiver circuit 411 if either signal Enable_1 or signal Enable_2 is active (logical 1) and signal DIS is passive (logical 0).

Driver circuit 414 advantageously includes not only the actual driver for switching switching element S41, but rather also a protective function. In the case of a permanent short-circuit of synchronization line 42 to positive DC voltage terminal B+, driver circuit 414 monitors the error by way of a suitable switching threshold and a time counter. After the arrival of the signal for turning on switching element S41, the time counter is started. If the voltage at the output of switching element S41 is above the switching threshold and the time defined for the time counter has elapsed, a corresponding state is recognized and switching element S41 is turned off again. In this way, a permanent high current via switching element S41 is prevented and therefore also overheating or failure of the component is avoided.

A further advantage of the present invention is that individual control circuits 4U through 4Y carry out at least the action of the independent load shedding protection individually in an unobstructed way, even if the synchronization line is faulty. For example, if a connection between two control circuits 4U through 4Y is interrupted, the groups which are thus divided synchronize individually.

What is claimed is:

1. A rectifier module for an active bridge rectifier, comprising:
two switching elements connected in series between two end terminals, and between which a center tap is formed; and
a control circuit including a monitoring unit, a synchronization unit, and a control unit;
wherein the monitoring unit is configured to detect a measuring voltage and to output a request signal when the measuring voltage exceeds an upper threshold value,
wherein the synchronization unit is configured to output a synchronization signal to a synchronization terminal as long as the monitoring unit outputs the request signal, and otherwise to monitor the synchronization terminal for a synchronization signal, and
wherein the control unit is configured to switch one of the two switching elements into the conductive state at least in sections during an activation period of time when the monitoring unit outputs the request signal and/or when the synchronization signal is detected and is optionally recognized as valid by the monitoring of the synchronization terminal,
wherein the rectifier module includes at least one capacitor for supplying the control circuit and/or the switching elements, and
wherein the control unit is configured to switch the one of the two switching elements, which is switched into the conductive state by the control unit, to be nonconductive until a voltage applied to the at least one capacitor exceeds a predefined value again, if it is determined during the request period of time that a voltage applied to the at least one capacitor falls below a predefined value.

2. The rectifier module of claim 1, wherein the monitoring unit is configured to end the output of the request signal at the earliest after the expiration of a minimum time and/or at the latest after the expiration of a maximum request period of time.

3. The rectifier module of claim 2, wherein the monitoring unit is configured to end the output of the request signal before the expiration of the request period of time if it is determined that a voltage used to charge the at least one capacitor falls below a threshold value.

4. The rectifier module of claim 1, wherein the monitoring unit is configured to output the request signal until the measuring voltage falls below a lower threshold value.

5. The rectifier module of claim 1, wherein the synchronization signal is only recognized as valid if the measuring voltage simultaneously exceeds the lower threshold value.

6. The rectifier module of claim 1, wherein the synchronization signal is recognized as valid as long as it does not exceed a predefined maximum duration.

7. The rectifier module of claim 1, wherein the control circuit includes an error diagnosis unit including a communication interface.

8. The rectifier module of claim 7, wherein the communication interface includes a serial interface to a communication bus, the control circuit including a bus controller provided with an address coding.

9. The rectifier module of claim 8, which is configured to turn off the communication interface if the measuring voltage exceeds the upper threshold value.

10. An active bridge rectifier, comprising:
a plurality of AC voltage terminals;
two DC voltage terminals; and
a plurality of half-bridges corresponding to the plurality of AC voltage terminals, each of the half-bridges being formed by a rectifier module, the switching elements of which are each incorporated with their end terminals in series between the DC voltage terminals and the center tap of which forms an AC voltage terminal of the active bridge rectifier;
wherein the rectifier module includes two switching elements connected in series between two end terminals, and between which a center tap is formed, and a control circuit including a monitoring unit, a synchronization unit, and a control unit,
wherein the monitoring unit is configured to detect a measuring voltage and to output a request signal when the measuring voltage exceeds an upper threshold value,
wherein the synchronization unit is configured to output a synchronization signal to a synchronization terminal as long as the monitoring unit outputs the request signal, and otherwise to monitor the synchronization terminal for a synchronization signal, and
wherein the control unit is configured to switch one of the two switching elements into the conductive state at least in sections during an activation period of time when the monitoring unit outputs the request signal and/or when the synchronization signal is detected and is optionally recognized as valid by the monitoring of the synchronization terminal,
wherein the rectifier module includes at least one capacitor for supplying the control circuit and/or the switching elements, and
wherein the control unit is configured to switch the one of the two switching elements, which is switched into the conductive state by the control unit, to be nonconductive until a voltage applied to the at least one capacitor exceeds a predefined value again, if it is determined during the request period of time that a voltage applied to the at least one capacitor falls below a predefined value.

11. The active bridge rectifier of claim 10, wherein the monitoring units of the rectifier modules are configured to detect a voltage, which is applied between the two DC voltage terminals, as a measuring voltage.

12. The active bridge rectifier of claim 10, wherein the synchronization terminals of the synchronization units in the rectifier modules are connected to one another via a synchronization line, so that a synchronization signal is always applied to the synchronization terminals when a synchronization signal is output by at least one of the synchronization units.

13. A generator array, comprising:
an active bridge rectifier; and
a generator including a generator controller, wherein the generator controller is powered via the DC voltage terminals;
wherein the active bridge rectifier includes a plurality of AC voltage terminals, two DC voltage terminals, and a plurality of half-bridges corresponding to the plurality of AC voltage terminals, each of the half-bridges being formed by a rectifier module, the switching elements of which are each incorporated with their end terminals in series between the DC voltage terminals and the center tap of which forms an AC voltage terminal of the active bridge rectifier,
wherein the rectifier module includes two switching elements connected in series between two end terminals, and between which a center tap is formed, and a control circuit including a monitoring unit, a synchronization unit, and a control unit,
wherein the monitoring unit is configured to detect a measuring voltage and to output a request signal when the measuring voltage exceeds an upper threshold value,
wherein the synchronization unit is configured to output a synchronization signal to a synchronization terminal as long as the monitoring unit outputs the request signal, and otherwise to monitor the synchronization terminal for a synchronization signal, and
wherein the control unit is configured to switch one of the two switching elements into the conductive state at least in sections during an activation period of time when the monitoring unit outputs the request signal and/or when the synchronization signal is detected and is optionally recognized as valid by the monitoring of the synchronization terminal,
wherein the rectifier module includes at least one capacitor for supplying the control circuit and/or the switching elements, and
wherein the control unit is configured to switch the one of the two switching elements, which is switched into the conductive state by the control unit, to be nonconductive until a voltage applied to the at least one capacitor exceeds a predefined value again, if it is determined during the request period of time that a voltage applied to the at least one capacitor falls below a predefined value.

14. The generator array of claim 13, further comprising:
a switching arrangement to turn off a power supply of an excitation field of the generator or the generator at least for a defined period of time when a synchronization signal is detected on the synchronization line and is optionally recognized as valid and/or when the measuring voltage exceeds the upper threshold value.

15. A motor vehicle electrical system, comprising:
at least one generator array, including an active bridge rectifier, and a generator including a generator controller, wherein the generator controller is powered via the DC voltage terminals;
wherein the active bridge rectifier includes a plurality of AC voltage terminals, two DC voltage terminals, and a plurality of half-bridges corresponding to the plurality of AC voltage terminals, each of the half-bridges being formed by a rectifier module, the switching elements of which are each incorporated with their end terminals in series between the DC voltage terminals and the center tap of which forms an AC voltage terminal of the active bridge rectifier,
wherein the rectifier module includes two switching elements connected in series between two end terminals, and between which a center tap is formed, and a control circuit including a monitoring unit, a synchronization unit, and a control unit, wherein the monitoring unit is configured to detect a measuring voltage and to output a request signal when the measuring voltage exceeds an upper threshold value, wherein the synchronization unit is configured to output a synchronization signal to a synchronization terminal as long as the monitoring unit outputs the request signal, and otherwise to monitor the synchronization terminal for a synchronization signal, and wherein the control unit is configured to switch one of the two switching elements into the conductive state at least in sections during an activation period of time when the monitoring unit outputs the request signal and/or when the synchronization signal is detected and is optionally recognized as valid by the monitoring of the synchronization terminal, wherein the rectifier module includes at least one capacitor for supplying the control circuit and/or the switching elements, and wherein the control unit is configured to switch the one of the two switching elements, which is switched into the conductive state by the control unit, to be nonconductive until a voltage applied to the at least one capacitor exceeds a predefined value again, if it is determined during the request period of time that a voltage applied to the at least one capacitor falls below a predefined value.

16. A method for operating at least one of an active bridge rectifier, a generator array, and a motor vehicle electrical system, the method comprising:

conductively connecting AC voltage terminals of the at least one of the active bridge rectifier, the generator array, and the motor vehicle electrical system to one another, as long as a synchronization signal is applied to the synchronization line and is optionally recognized as valid;

wherein the active bridge rectifier is the active bridge rectifier of claim 10, wherein the generator array is the generator array of claim 13, and wherein the motor vehicle electrical system is the motor vehicle electrical system of claim 15.

17. A control unit for operating at least one of an active bridge rectifier, a generator array, and a motor vehicle electrical system, comprising:

a control arrangement to conductively connecting AC voltage terminals of the at least one of the active bridge rectifier, the generator array, and the motor vehicle electrical system to one another, as long as a synchronization signal is applied to the synchronization line and is optionally recognized as valid;

wherein the active bridge rectifier is the active bridge rectifier of claim 10, wherein the generator array is the generator array of claim 13, and wherein the motor vehicle electrical system is the motor vehicle electrical system of claim 15.

18. A computer readable medium having a computer program, which is executable by a processor of a control unit, comprising:

a program code arrangement having program code for operating at least one of an active bridge rectifier, a generator array, and a motor vehicle electrical system, by performing the following:

conductively connecting AC voltage terminals of the at least one of the active bridge rectifier, the generator array, and the motor vehicle electrical system to one another, as long as a synchronization signal is applied to the synchronization line and is optionally recognized as valid;

wherein the active bridge rectifier is the active bridge rectifier of claim 10, wherein the generator array is the generator array of claim 13, and wherein the motor vehicle electrical system is the motor vehicle electrical system of claim 15.

* * * * *